United States Patent [19]
Siewert et al.

[11] Patent Number: 5,221,825
[45] Date of Patent: Jun. 22, 1993

[54] SENSING OF GAS METAL ARC WELDING PROCESS CHARACTERISTICS FOR WELDING PROCESS CONTROL

[75] Inventors: T. A. Siewert, Boulder; R. B. Madigan, Longmont; T. P. Quinn, Boulder, all of Colo.

[73] Assignee: The United States of America as represented by the Secretary of Commerce, Washington, D.C.

[21] Appl. No.: 891,840

[22] Filed: Jun. 1, 1992

[51] Int. Cl.$^5$ .................................. B23K 9/095
[52] U.S. Cl. .......................... 219/130.01; 219/130.21
[58] Field of Search ............... 219/130.01, 130.21, 219/137 PS

[56] References Cited

U.S. PATENT DOCUMENTS

| | | |
|---|---|---|
| 3,126,671 | 3/1964 | Manz . |
| 3,141,085 | 7/1964 | Manz . |
| 3,581,053 | 12/1967 | Manz . |
| 3,632,960 | 1/1972 | Erdmann-Jesnitzer ......... 219/130.01 |
| 3,673,377 | 6/1972 | Erdmann-Jesnitzer ......... 219/130.01 |
| 3,809,853 | 5/1974 | Manz . |
| 3,864,542 | 2/1975 | Fletcher et al. . |
| 4,419,562 | 12/1983 | Jon et al. . |
| 4,711,986 | 12/1987 | Lillquist et al. . |
| 4,718,768 | 3/1988 | Cueman . |
| 4,767,911 | 8/1988 | Maram et al. . |
| 4,825,038 | 4/1989 | Smartt et al. .................. 219/130.21 |
| 4,859,830 | 8/1989 | Case, Jr. et al. . |
| 4,943,701 | 7/1990 | Nakajima et al. . |
| 5,086,207 | 2/1992 | Deam . |

OTHER PUBLICATIONS

Heald et al, "Droplet Transfer Modes for a Mil 100S-1 GMAW Electrode", U.S. Dept. of Commerce, Oct. 1991.
Salter et al, "Procedure Selection for Arc Welding", Metal Construction, pp. 544-550, Sep. 1981.
Adam et al, "Sensing of GMAW Droplet Transfer Modes Using an ER 100S-1 Electrode", *Welding Research Supplement* pp. 103-s to 108-s, Mar., 1990.
Liu et al, "Metal Transfer Mode in Gas Metal Arc Welding", *ASM International*, May 1989.
National Institute of Standards and Technology, "Arc Sensor Module for the Programmable Automated Welding System (PAWS)", Mar., 1991.
Naidenov, "Mechanical Control of the Transfer of Electrode Metal", *Avt. Svarks*, 1969, No. 12, pp. 31-33.
Agnew et al, "Introduction to Pulsed-Spray Arc Welding", Welding Journal, Apr. 1966, pp. 284-289.

*Primary Examiner*—Clifford C. Shaw
*Attorney, Agent, or Firm*—Robert G. Lev

[57] ABSTRACT

A method of sensing and controlling a gas metal arc welding process employs high frequency sampling of electrical signals from the welding circuit. The sampled signals are operated upon by predetermined processes to determine characteristics indicative of on-going weld quality and the future weld quality. The processes which operate upon sampled electrical signals determine shielding gas quality, the occurrence of short circuits and frequency thereof; pulse frequency and standard deviation thereof, contact tube wear and trends in the sampled electrical signals.

25 Claims, 6 Drawing Sheets

SENSING OF GAS METAL ARC WELDING PROCESS CHARACTERISTICS FOR WELDING PROCESS CONTROL

TECHNICAL FIELD

The present invention relates generally to sensing welding process characteristics, and more particularly to the sensing of gas-metal-arc welding process characteristics to facilitate control of the welding process, correcting flaws indicated by the detected process characteristics.

BACKGROUND ART

Gas-metal-arc-welding (GMAW) is a process in which a consumable electrode is continuously fed into an electric arc. GMAW uses the electrical arc as the heat source for melting both the base metal to be welded and the filler metal added to the weld An inert or slightly reactive shielding gas is used to protect the molten metal from the atmosphere. The shielding gas must have sufficient flow to displace the atmosphere from the arc as well as the weld pool until solidification occurs and the metal cools to a temperature where it does not react with the high oxygen and nitrogen levels in the atmosphere. The shielding gas also ionizes to form a high-temperature plasma which carries the current A mixture of argon with additions of oxygen or carbon dioxide is generally used for welding low alloy steels. Typical additions to the inner gas are 1-5% oxygen by volume or 3-25% carbon dioxide by volume. Proper control of GMAW processes depends upon timely monitoring of the shielding gas condition.

Most GMAW is performed with a constant voltage power source, which causes the arc length to be self regulating. If some perturbation causes the arc length to increase, the following steps bring the arc length into equilibrium: the circuit resistance increases; the arc current decreases; the resulting lower current melts the electrode more slowly than the electrode feed rate and the arc length decreases to a stable length. If some perturbation causes the arc length to decrease, the circuit resistance decreases and the system returns to a balance through a sequence opposite to that stated previously.

A more comprehensive description of GMAW is included in the National Institute of Standards and Technology Publication No. NISTIR3976, authored by Heald, Madigan, Siewert and Liu, entitled "Droplet Transfer Modes for a MIL 100 S-1 GMAW Electrode," published October, 1991. This publication is hereby incorporated into the present application by reference.

FIG. 1 of the present application illustrates how the contact tube 1-6, the electrode extension 1-4 and the arc 1-7 are all elements of a GMAW electrical circuit. Changes in the resistance of any element effect the electrical impedance of that circuit. Metal transfer across the arc is characterized by repetitive events, each event modulating a circuit impedance in a characteristic pattern. The characterization of the various droplet modes and events that interfere with stable transfer, permit the voltage or current records derived from sensors 1-11 to be used to monitor the arc quality.

It is well known in welding technology to use a pulsed power source to make welds. The signal from such a source has significant current and voltage pulses which are designed to stimulate the formation and detachment of droplets at the electrode tip. The power source also has an internal logic circuit that changes the pulse frequency along with the wire feed rate. Examples of pulsed GMAW power sources are found in U.S. Pat. No. 3,864,542 to Fletcher et al. and U.S. Pat. No. 4,943,701, issued to Nakajima et al.

The aforementioned systems can employ through-the-arc sensing. This technique typically uses a low-frequency sensing strategy. For example, seam tracking algorithms look for changes in the mean current or voltage (over a period of several tenths of a second). Others, such as the system described in the patent issued to Fletcher et al. look for a peak signal over a period of time so that the correct frequency can be correlated to that peak and the power supply pulse rate adjusted to operate at that frequency. It is the low rate sampling of these conventional systems which prevents timely control of the welding process to correct flaws, and keeps these systems from being effectively used for automatic or robot-controlled welding.

The system of FIG. 1 is arranged so that computer 1-10 processes signals sampled from sensors 1-11, and makes determinations for altering the weld process by sending control signals to welding power source 1-12. In order for this to be done on an automated basis, criterion from the sampled signals has to be developed so that possible flaws in the welding process can be detected on a real-time basis and corrected in time to save the on-going welding process. Only in this manner can automated welding be carried out without an unacceptable number of bad welds.

Certain characteristics of the welding process are critical in determining if an ongoing welding process should be altered or terminated. One example is the pattern of electrical signals associated with short circuiting phenomena and globular transfer. These phenomenon provide information regarding transfer mode, droplet transfer frequency, and droplet transfer stability. The spray transfer mode (a mode with smaller fluctuations as the droplets are transferred) also has corresponding electrical signals from which weld quality information can be obtained. Detection of short circuiting is indicative of an improper transfer mode when the spray mode is desired. If welding is being carried out in the short circuit transfer mode, the frequency of the short circuits will indicate if the correct voltage or current levels are being output by the GMAW power source.

Loss of shielding integrity is another major concern in GMAW. Through-the-arc sensing is capable of detecting this problem. It has been experimentally determined that there is a gradual increase in the voltage envelope as the shielding gas quality degrades. This is followed by a period of fluctuations in the voltage as the internal logic control of the power source seeks to maintain arc stability. Another, more subtle problem, is minor contamination of the integrity of the shield gas due to a cross draft or incorrect gas mixture. When the gas shield is contaminated, the voltage record becomes ragged as the contaminant, for example nitrogen, is increased. The changes in the voltage record due to contamination of the gas shield are different from those caused other phenomena such as tube wear.

However, conventional systems are unable to utilize these distinctions. Consequently, conventional systems are unable to carry out the precise adjustments needed for the real time control required in automated welding systems.

DISCLOSURE OF THE INVENTION

One object of the present invention is to respond in real time to welding process characteristics so as to correct welding flaws or terminate the welding process before the weld is completed.

Another object is to detect the short circuit transfer mode, the short circuit frequency, shielding gas loss or compromise, contact tube wear, and pulse detection and frequency.

It is yet another object to predict trends in ongoing weld process on a real time basis.

A further object is to detect welding process characteristics and in response thereto automatically alter the welding process without intervention of a human operator.

These objects are achieved by a system using a high sampling rate of electrical signals indicative of welding process characteristics and operating on the sampled electrical systems using the following processes to obtain data indicative of specific weld characteristics so that a proper, timely response can be made thereto.

According to a first embodiment of the present invention, a method of sensing and controlling a welding process is carried out in a welding system having means for applying a weld using a contact tube, a power source to energize the means for applying the weld by forming a circuit therewith, means for sensing in-process weld characteristics and processing means for controlling the weld process in response to the sensed in-process weld characteristics. This system is operated according to a process including the following steps:

(a) sampling an electrical signal;

(b) normalizing each sample using a calculated average signal value from a sampling interval;

(c) determining power spectral density of the normalized sample signal;

(d) determining a contact tip wear sensitivity factor for the contact tube based upon an integrated value of the power spectral density;

(e) normalizing the contact tip wear sensitivity factor with a value of contact tip wear sensitivity for a new contact tube; and (f) stopping the weld process if the normalized contact tip wear sensitivity factor is beyond predetermined limitations.

This process permits the welding process to be terminated before irregularities in the contact tube result in a substantial number of improper welds.

According to another embodiment of the present invention, a method of sensing and controlling a welding process to determine trends in the welding process is carried out using a system including means for applying a weld to material to be welded, a power source to energize the means for applying a weld by forming a circuit therewith, means for sensing in-process weld characteristics, and processing means for controlling the weld process in response to sensed in-process weld characteristics. This system is operated using a process to predict weld characteristics based upon prior data. The process includes the following steps:

(a) determining and storing an average value of signals from prior sampling intervals;

(b) determining a straight line based upon previously stored data for N sampling intervals using a statistical process;

(c) determining a confidence interval based upon the straight line;

(d) predicting a value of a signal sampled from the circuit for a future sampling interval and setting a confidence limit based upon the predicted value; and (e) adjusting the welding process if a sampled electrical signal from the next sampling interval is outside the confidence limits.

According to a third embodiment of the invention, a method of sensing a controlling a welding process is carried using a system which includes means for applying a weld to a material to be welded using a shielding gas, a power source to energize the means for applying the weld by forming a circuit therewith and generating pulses at selected frequencies, means for sensing in-process weld characteristics and processing means for controlling the weld process in response to the sensed in-process weld characteristics. These characteristics are indicative of shield and gas quality, short circuit occurrence and frequency, and pulse frequency and standard deviation thereof. The welding system is operated according to the following process having the steps of:

(a) sampling an electrical signal reflecting in-process weld characteristics from the circuit;

(b) determining local, maximum and minimum values for the sampled electrical signal;

(c) determining a starting point for each pulse;

(d) determining an average pulse period based upon the start of each pulse;

(e) determining a standard deviation of the average pulse period;

(f) determining an average pulse voltage for each pulse;

(g) determining a mean of the average pulse voltage;

(h) determining a standard deviation of average pulse voltage based upon the mean of the average pulse voltage;

(i) calculating shielding gas condition based upon the average pulse voltage and the standard deviation of the average pulse voltage;

(j) comparing the gas condition to predetermine thresholds to determine if the weld process must be terminated;

(k) determining the occurrence of a short circuit based upon the local minimum value of the sampled electrical signal;

(l) determining an average short circuit frequency by calculating time intervals between short circuit occurrences; and (m) adjusting the power source in response to the average short circuit frequency.

BEST MODE FOR CARRYING OUT THE INVENTION

The present invention differs from previous through-the-arc systems by drawing conclusions about the weld quality, not just detecting joint edges of, power peaks, or logging data. The rapid sampling rate, up to 50 KHz, reveals the fine structure of the voltage and current patterns. These patterns have been experimentally related to weld stability and quality. Frequent assessment of weld quality using such patterns allows an analysis strategy to be used for real time control of the weld cycle, or interruption of the weld process before an unacceptable weld is produced. This high sampling rate, in combination with the processes illustrated in the flow charts of FIGS. 2–7, permit a self-correcting automatic welding system to be used.

Figure 1:
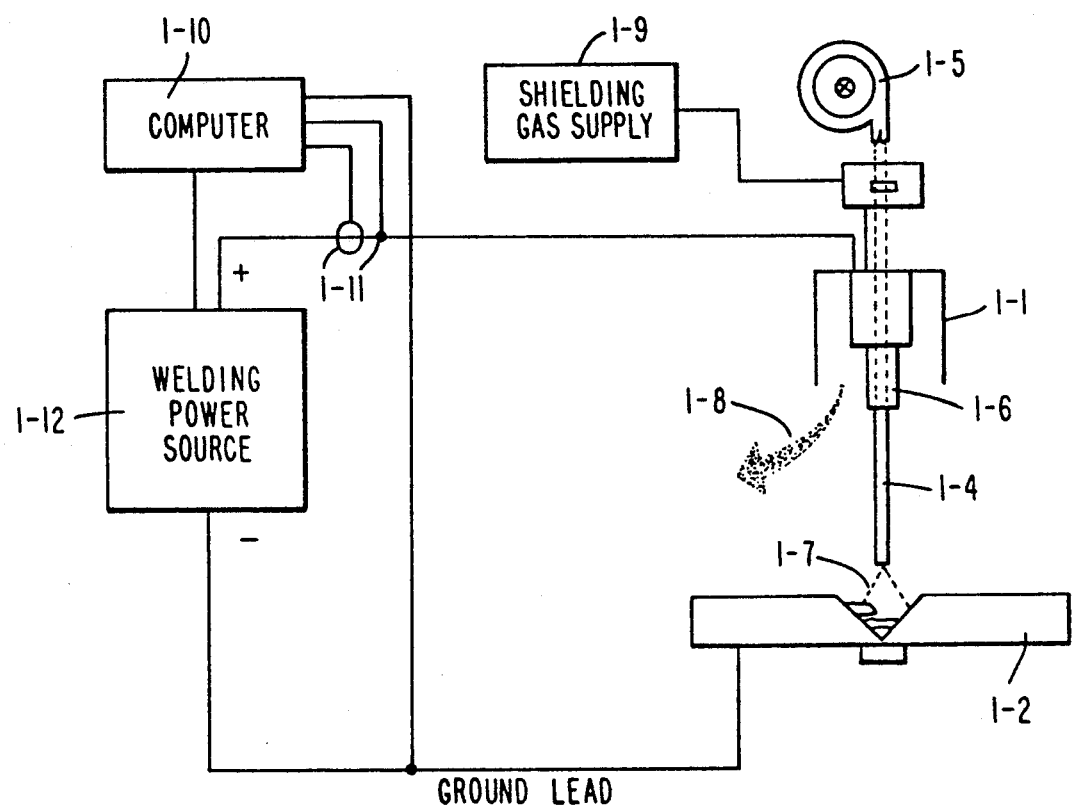
FIG. 1 illustrates the circuit arrangement used for carrying out the present invention.

FIG. 1 illustrates a circuit arrangement for carrying out the process of the present invention FIG. 1 depicts a conventional circuit and differs from conventional systems only in the high rate of signal sampling conducted at sensors 1-11, and in the manner in which those samples are processed (as illustrated in the flow charts of FIGS. 2–7) in computer 1-10. Because of the rapid weld characteristic evaluations made by computer 1-10, welding power source 1-12 can be controlled to alter the weld at arc 1-7 before the weld is irretrievably flawed Since minor irregularities in the shielding gas supply 1-9 can be rapidly detected, the welding process can be terminated and the gas supply corrected before the expense of numerous unacceptable welds has accrued. The rapid response of the present system also results in an early detection of irregularities in the electrode extension 1-4 and the contact tube 1-6 thus terminating the weld before significant amounts of material have been wasted from electrode feeder 1-5. It is noted that computer 1-10 could also be used to control the operation of electrode feeder 1-5 in response to weld characteristic data derived from electrical signals detected by sensors 1-11.

The sensors 1-11 can be well known voltage taps, current sensors or Hall-effect transducers. Welding elements 1-1, 1-4, 1-5, 1-6, 1-9 and 1-12 are all conventional components well explained in other publications concerning this technology. Computer 1-10 can be a standard personal computer, preferably having a 25 MHz, or faster clock. The computer interface also requires one or two analog-to-digital boards, depending upon features desired.

The sampling rate of the system is limited only by the speed of the computer processing the sampled electrical signals according to the processes of FIGS. 2–7. While the present invention has only been operated in the 50 MHz range, it is possible that sampling, signal processing and weld control can be carried out in the gigahertz range. The present invention is limited only by the speed of the processing computer. While some of the processes of FIGS. 2–7 require relatively low sampling rates, others will benefit from the highest possible sampling rate. For example, the process used to predict the trends in the electrical record indicative of weld characteristics (FIG. 3) will benefit from a higher sampling rate providing for faster correction of weld characteristics outside desired limits.

Figures 2, 3:
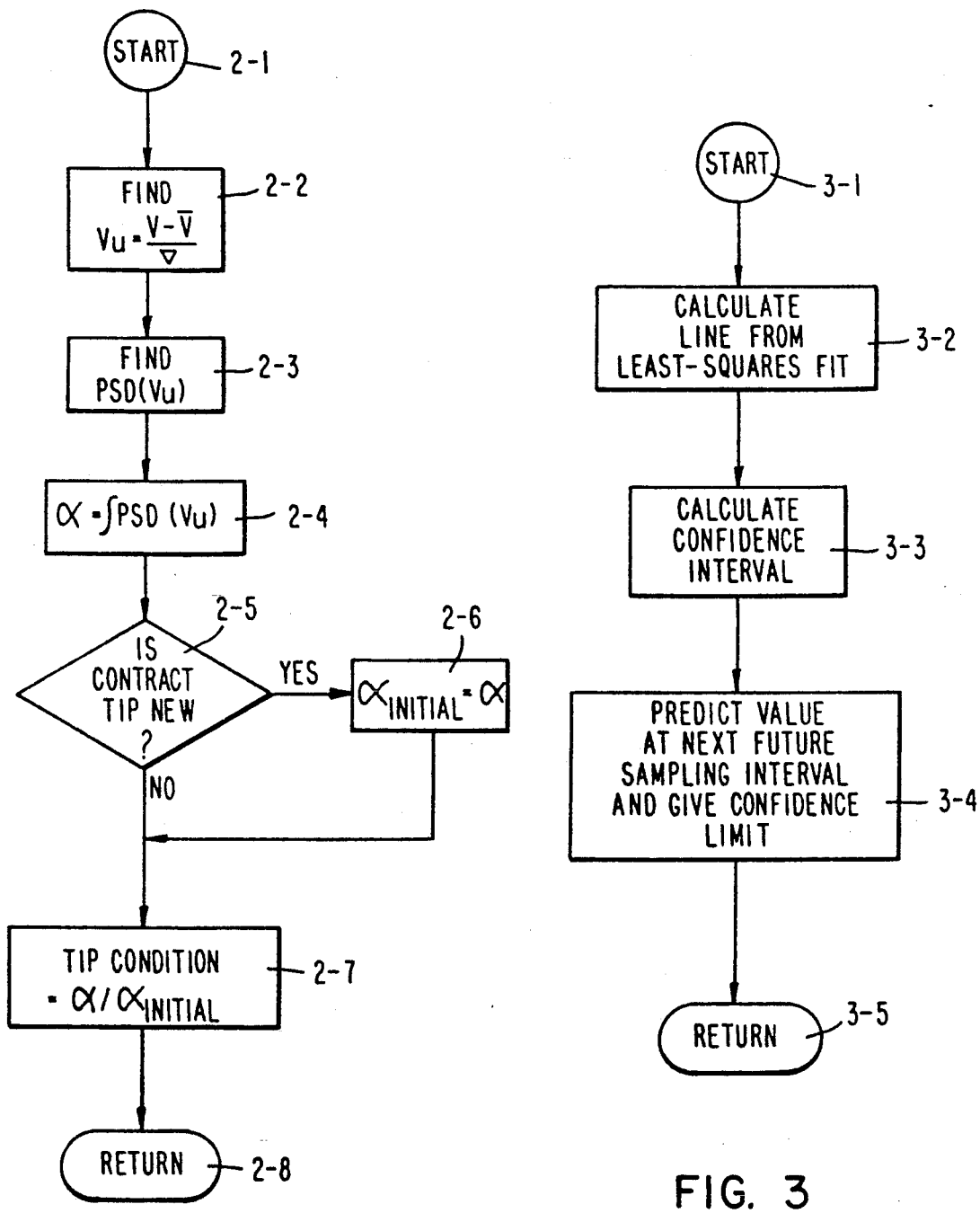
FIG. 2 is a flow chart for determining contact tube wear.
FIG. 3 is a flow chart illustrating a process for determining trends electrical signals indicative of weld characteristics.
Figure 4:
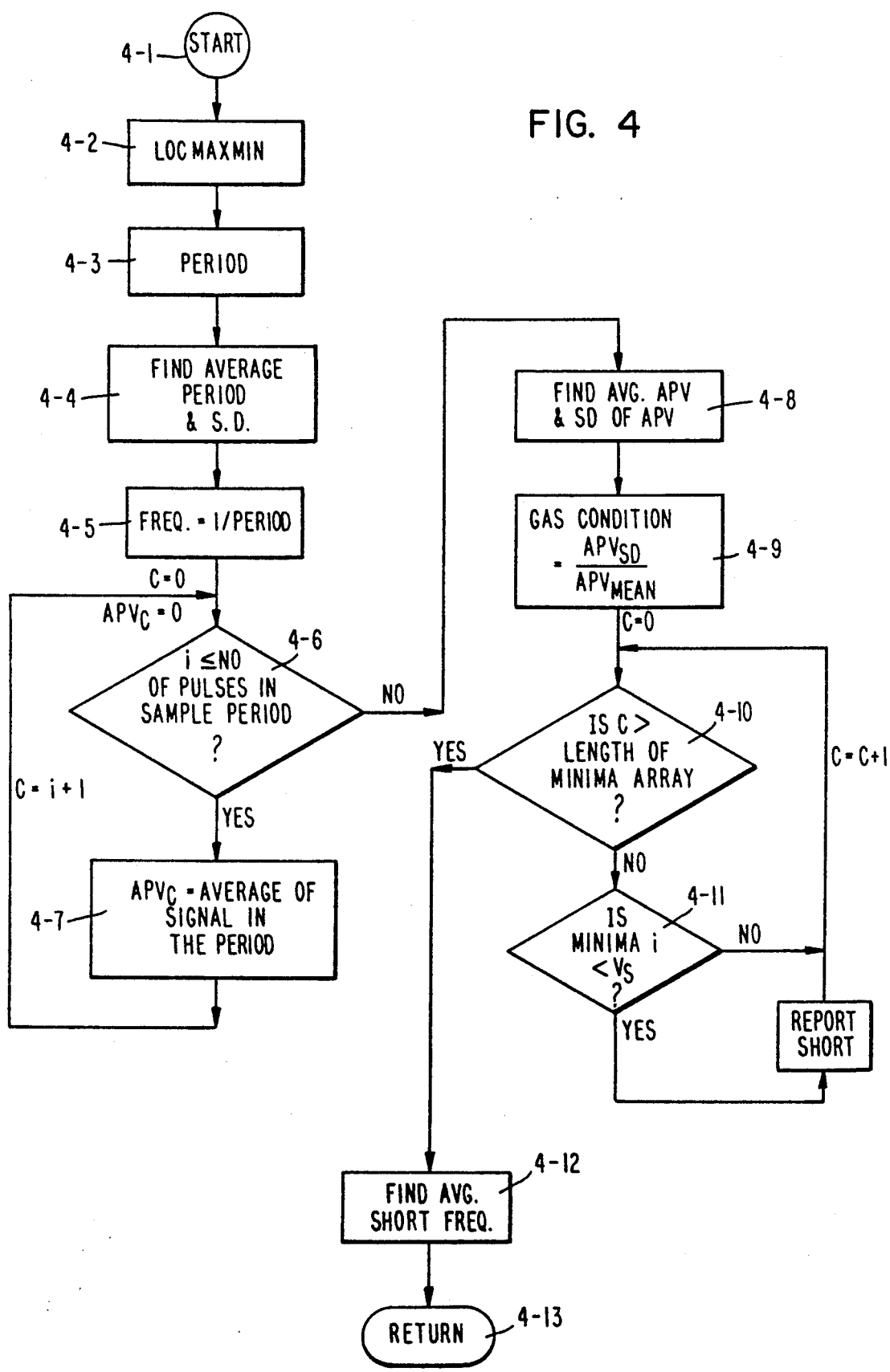
FIGS. 4A and 4B are flow charts of processes for determining shielding gas loss, short circuit conditions, short circuit frequency, pulse frequency and the standard deviation of the pulse frequency.
Figure 5:
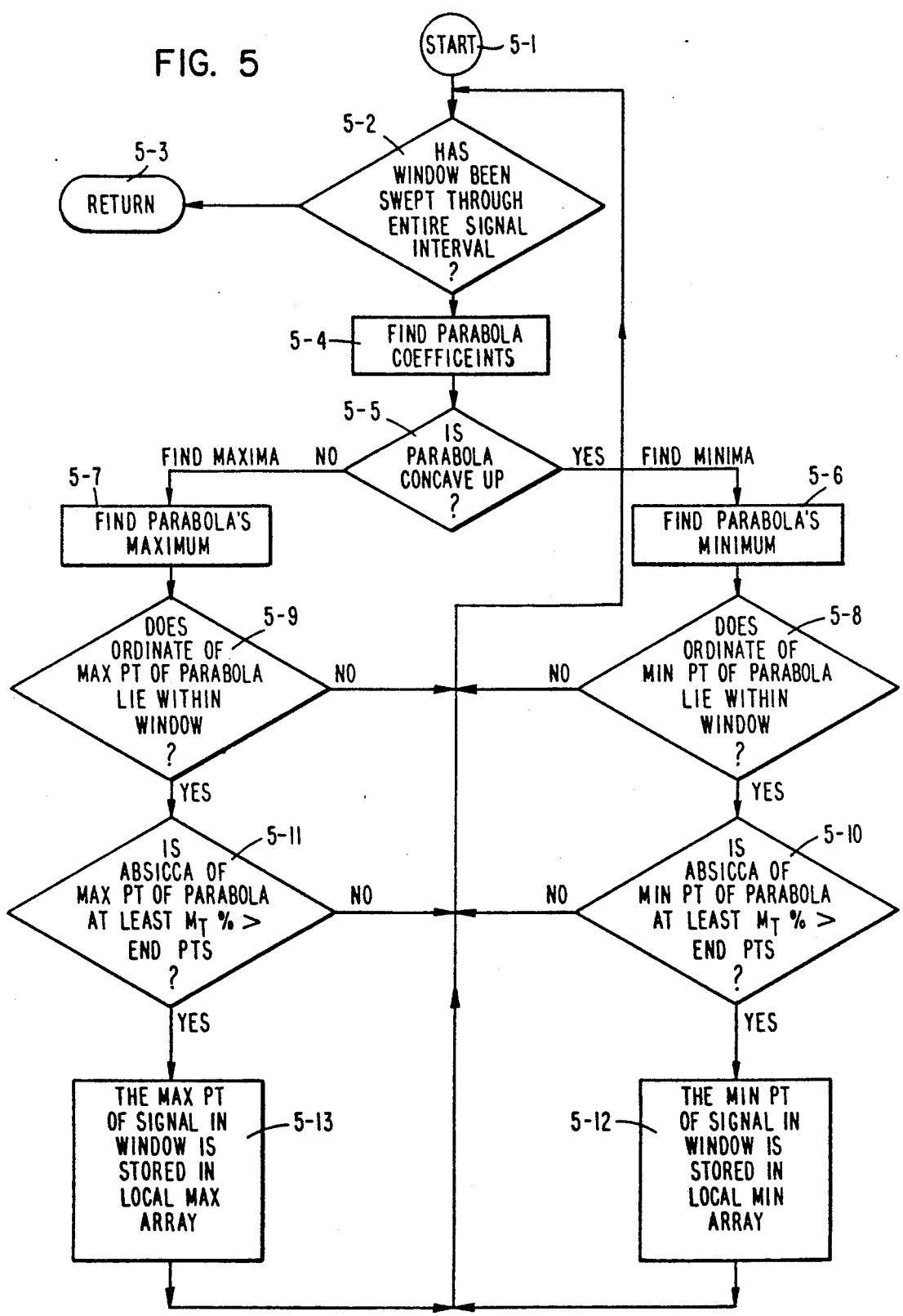
FIG. 5 is a flow chart of a process for determining local minimum and maximum values of the sampled electrical signals.

One of the processes which would not benefit from an increased sampling rate is the procedure for determining contact tube wear as illustrated in FIG. 2. This process determines a number indicative of contact tube wear from voltage or current sampled from the weld circuit. This process can operate in a sampling range of 8–500 Hz, and preferably in a range of 8–250 Hz. The process starts at step 2-1 when a signal is sampled. The sampled signal is normalized using an average signal taken from a sampling interval. The normalized signal is expressed as:

$$V_n = (V-\overline{V})/\overline{V}$$

where $V_n$ is the normalized signal, V is the sampled signal and $\overline{V}$ is the mean signal derived from the sampled signal. At step 2-3 the power spectral density of the normalized signal is determined. At step 2-4 the power spectral density is integrated between a frequency of 0 and the cut-off frequency to determine the contact tube wear sensitivity factor $\alpha$. At step 2-5 a determination is made whether the contact tube is new. If so, $\alpha$ is set at a value corresponding to that of a new contact tube at step 2-6. Factor $\alpha$ is then normalized at step 2-7 to determine a value indicative of the contact tube condition. At step 2-8 the process is restarted and/or an adjustment (such as termination) is carried out on the welding process.

In contrast to the process for determining contact tube wear, the process for predicting trends in the sampled electrical signals, as illustrated in FIG. 3, benefits from the highest possible processing rate which computer 1-10 will handle. The trend is predicted by taking the average values of the sampled signals from a predetermined number of sample intervals and performing a standard statistical procedure.

Prior to the process of FIG. 3, the average value of the sample interval has been calculated and stored in an array using another process which is well known and, thus, not described in this application.

At step 3-1 the previously stored information is input based upon average current and voltage values calculated for a predetermined period of time at the end of each span of time. Using a statistical method found in the text *Applied Regression Analysis* by Draper and Smith, Wiley, 1966, a straight line is then fit to the stored data for a predetermined number of previous time periods (step 3-2) using the standard least squares algorithm described in the cited textbook. Based upon the generation of the subject line, a confidence interval is calculated at step 3-3. At step 3-4, the line is then used to predict the level of the signal at some time during the future (having the same length of time as the period used to select the prerecorded data). If the sampled signal is going outside of the control limits within the calculated confidence interval, then the process is considered to be out of control and appropriate correction is made at step 3-5. The absolute value of the slope of the calculated line is also compared to a control limit, and if it exceeds the control limit, the process is also considered to be out of control, and the appropriate correction is made at step 3-5.

This correction takes the form of adjusting the power source or the wire feed speed at electrode feeder 1-5 in FIG. 1. If a constant current power source is being used and a sampled voltage goes outside of the control limits, the wire feed is adjusted accordingly. For the same kind of voltage source, if the sampled current goes outside of the control limit, the power source current is adjusted.

For a constant voltage power source, if the sampled current is outside of the control limits, the wire feed is adjusted accordingly. For the same type of power source, if the sampled voltage is outside of the control limit, the power supply voltage is adjusted accordingly.

The procedure illustrated in the flow chart of FIGS. 4a and 4b operates best at a sampling rate of 20-30 times per pulse period. This procedure determines aberrations in the shielding gas, a short circuit condition, frequency of short circuits, the pulse frequency and its standard deviation.

The subject procedure is started at step 4-1 when electric signals are sampled to be processed with previously stored data. Another process (FIG. 5a) determines local maximum and minimum values of the previously sampled signals. At step 4-2 these values are input into the subject procedure of FIG. 4a. At step 4-3 another procedure (in FIGS. 6 and 7) is relied upon for providing the starting point of each pulse period so that the pulse period duration can be determined. In step 4-4 the average pulse period is determined based upon previously stored data and sampled data. In step 4-5 the average pulse frequency and standard deviation thereof is determined. Using this information, an average pulse voltage for each pulse sample is determined (steps 4-6 and 4-7). At step 4-8 the average standard deviation of the average pulse voltage series is determined. A sensitivity parameter is calculated at step 4-9 as:

$$S = APV_{SD}/APV_{MEAN}$$

If this sensitivity parameter exceeds a predetermined threshold, the shielding gas quality is deemed to be insufficient. Normally the welding process is terminated when the shielding gas applied is judged to be insufficient.

The occurrence of a short circuit condition is determined at steps 4-10 and 4-11 when a minimum voltage is detected. Usually the minimum voltage is less than $pV_{mean}$, wherein p is some fraction (usually 0.5) and $V_{mean}$ is the mean voltage of the sampled interval. At step 4-12 the time between the short circuit occurrences is calculated thereby providing a short circuit frequency. At step 4-13 the frequency of the power supply is adjusted where appropriate to correct a detected short circuit frequency which is outside of predetermined limits. If a short circuit condition is detected in a mode other than the short circuit transfer mode, the power supply current is increased for a constant voltage power supply, and the power supply voltage is increased for a constant voltage power supply.

The process of FIG. 5a is used to determine the values of local maximum and minimum value of the sampled electrical signal. These maximum and minimum values are applied to the process illustrated by the flow chart of FIGS. 4a and 4b. At step 5-1 an electrical signal is sampled, and at step 5-2 a window is swept through the entire interval of the electrical signal. (Generally the electrical signal interval is several pulses in length.) A parabola is fit to the signal data in the window, and the coefficients of the parabola are determined at step 5-4. Based upon the parabola coefficients a determination is made at step 5-5 as to whether the parabola is positioned so as to be concave-up or concave-down. If the parabola is arranged so as to be concave-down, the parabola's maximum point is determined at step 5-7. Then a determination is made of whether the maximum point of the parabola lies within the window at step 5-9. A second determination is made whether the abscissa of the maximum point of the parabola is a predetermined percentage greater than the end points of the parabola within the window. (This percentage value is typically 1%.) Then the maximum point of the signal in the window is stored in an array containing the local maximum signal values. This array is read out when required for the process of FIGS. 4a and 4b.

If the parabola is arranged to be concave-up, the parabola's minimum point is found at step 5-6. A determination is then made at step 5-8 if the ordinate of the minimum point of the parabola lies within the window. At step 5-10 another determination is made whether the abscissa of the minimum point of the parabola is a predetermined percentage less than the end points of the parabola within the window. Then, the minimum point is stored in a special array containing minimum signal values. These values are read out when required for use in the process illustrated by the flow charts of FIGS. 4a and 4b.

Figure 6:
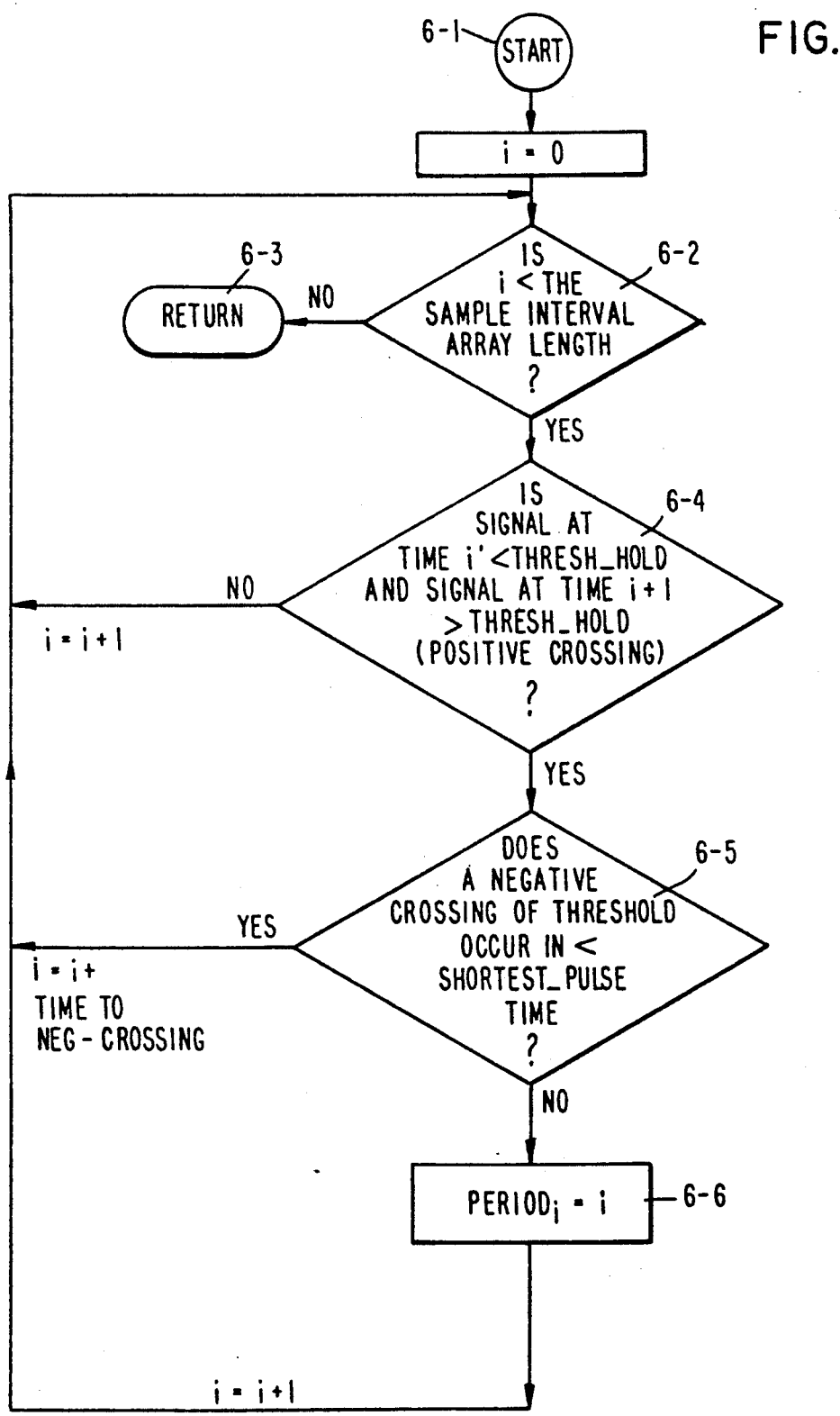
FIG. 6 is a flow chart illustrating a method for determining the start of each pulse, when a power source pulsing logic signal is available.

The flow chart of FIG. 6 illustrates a method of determining the starting point of each pulse period. When a power source pulsing logic signal from the power supply is available, the flow chart of FIG. 6 can be used, and step 6-1 is initiated using the pulsing logic signal. At step 6-2 a data array index is tested to determine if its length is less than the length of a sample interval array. If not, the process is restarted at step 6-3. At step 6-4 a data array index is tested to determine if the signal at a time period represented by the data array index is less than a predetermined threshold. A further test is made to determine if a signal associated with an incremented data array index is greater than a predetermined threshold. By these two comparisons a determination of the existence of a positive crossing of the threshold value is made. At step 6-5 a determination is made of whether a negative crossing of the threshold occurs in less than the shortest pulse time. If this is not the case then the data array index is stored in an array containing pulse period starting points as indicated in step 6-6. This array is read out for use in the process illustrated by the flow charts of FIGS. 4a and 4b.

Figure 7:
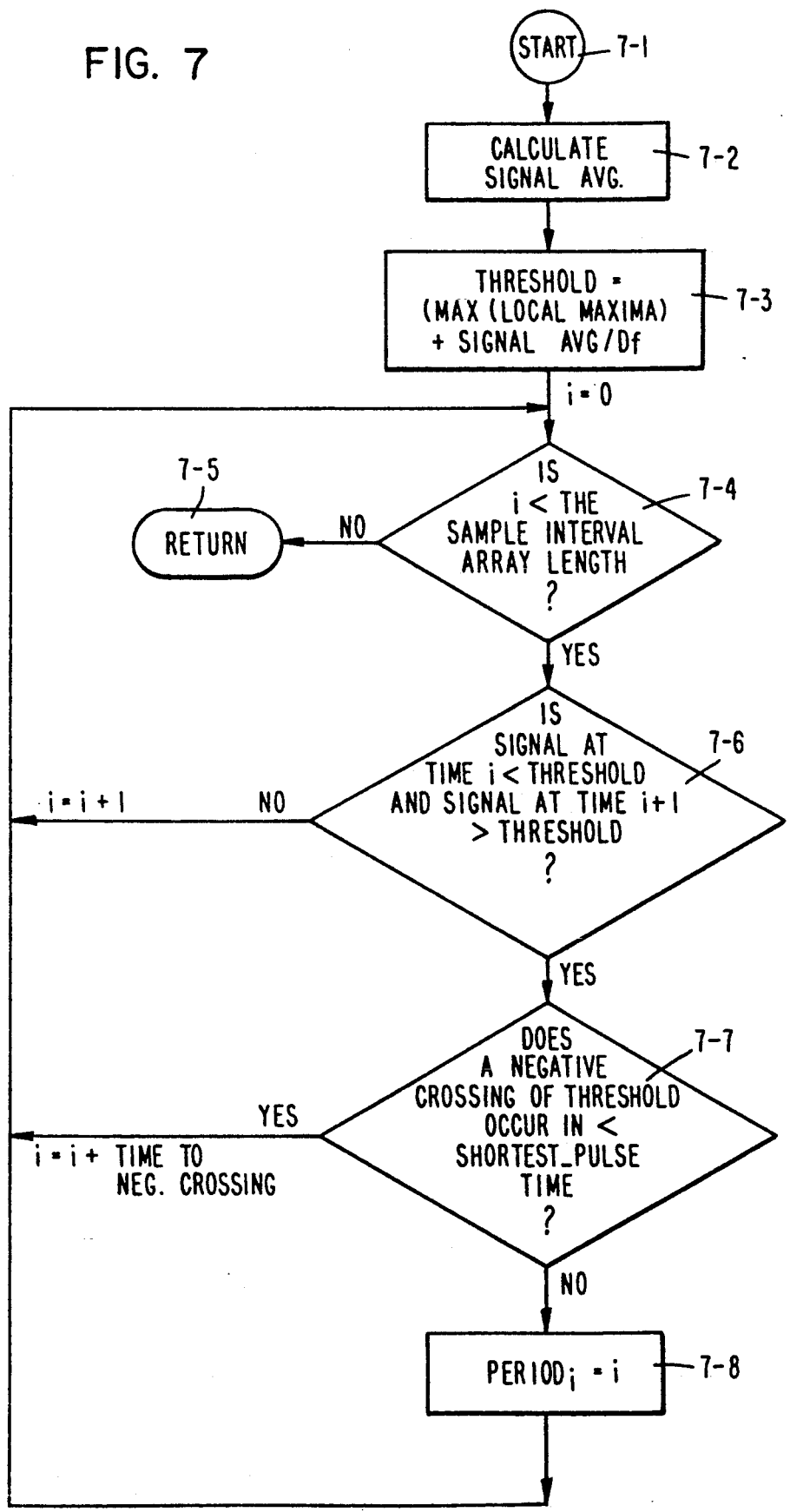
FIG. 7 is a flow chart illustrating a method for determining the start of each pulse when a power source pulsing logic signal is not available.

When the power source pulsing logic is not available, the flow chart of FIG. 7 is used to determine the beginning of each pulse period. At step 7-1 sampling of electrical signals occurs, and based upon data from these electrical signals an average signal is calculated at step 7-2. A threshold voltage (or current) is calculated by adding the average voltage in the data record to the largest local maximum signal value found in the record and dividing that sum by a predetermined amount (usually 2). The remainder of the FIG. 7 process from step 7-4 through 7-8, is the same as that of steps 6-2 through 6-6 of FIG. 6.

The sampling rate of the processes of FIGS. 6 and 7 is approximately the same as that illustrated in FIGS. 4a and 4b, i.e. 20-30 samples per pulse.

The present invention is also applicable to flux core arc welding. The automatic control made possible by the present invention would be particularly pertinent to this type of welding since large quantities of electrode material are consumed in this type of welding, and the relation control of the present invention could substantially limit wasted electrode material. Computer 1-10 could be used to control the electrode feeder 1-5 for either the flux core arc welding process or for the present GMAC process.

Although a number of arrangements of the invention have been mentioned by way of example, it is not intended that the invention be limited thereto. Accordingly, the invention should be considered to include any and all configurations, modifications, variations, combinations or equivalent arrangement falling within the scope of the following claims.

We claim:

1. A method of sensing and controlling a welding process carried out in a system including means for applying a weld using a contact tube, a power source to energize said means for applying a weld by forming a circuit therewith, means for sensing in-process welding characteristics and processing means for controlling said welding process in response to sensed in-process welding characteristics, said method comprising the steps of:
   (a) sampling an electrical signal reflecting in-process weld characteristics from said circuit;
   (b) normalizing each sample with a calculated average signal in a sampling interval;
   (c) determining power spectral density of said normalized sample signal;
   (d) determining a contact tube wear sensitivity factor for said contact tube based upon an integrated value of said power spectral density;
   (e) normalizing said contact tip wear sensitivity factor with a value of contact tube wear sensitivity for a new contact tube; and,
   (f) stopping said weld process if said normalized contact tube wear sensitivity factor is beyond predetermined limitations.

2. The method of claim 1, wherein said electrical signals are sampled at a rate having a range of 8–250 Hz.

3. The method of claim 1, wherein said power spectral density is integrated from a frequency of 0 Hz to a predetermined cutoff frequency.

4. The method of claim 1, wherein current is sampled if said power source is voltage controlled.

5. The method of claim 1, wherein voltage is sampled if said power source is current controlled.

6. The method of claim 1, wherein said means for applying a weld carries out a gas metal arc welding process.

7. The method of claim 1, wherein said means for applying a weld carries out a flux core arc welding process.

8. A method of sensing and controlling a welding process to determine trends in said welding process, carried out in a system including means for applying a weld to material to be welded, a power source to energize said means for applying a weld by forming a circuit therewith, means for sensing in-process welding characteristics, and processing means for controlling said welding process in response to sensed in-process welding characteristics, said method comprising the steps of:
   (a) determining and storing an average value of signals from prior sampling intervals;
   (b) determining a straight line based upon previously stored data for N sampling intervals using a statistical process;
   (c) determining a confidence interval based upon said straight line;
   (d) predicting a value of a signal sampled from said circuit for a future sampling interval and setting a confidence limit based upon said predicted value; and
   (e) adjusting said welding process if a sampled electrical signal from a next sampling interval is outside said confidence limits.

9. The method of claim 8, herein said straight line is determined by a least square algorithm.

10. The method of claim 8, further comprising the step of comparing a slope of said straight line to predetermined limits to determine if sampled electrical signals are outside said confidence limits.

11. The method of claim 8, wherein the step (e) of adjusting the welding process comprises adjusting a wire feed device included with said means for applying a weld when sampled voltage is outside said confidence limits, and adjusting currents of said power source when sampled current is outside said confidence limits for a system using a constant current power source.

12. The method of claim 8, wherein the step (e) of adjusting the welding process comprises adjusting a wire feed device included with said means for applying a weld when sampled current is outside said confidence limits, and adjusting the power supply voltage when sampled voltage is outside said confidence limits for a system using a constant voltage power source.

13. The method of claim 8, wherein electrical signals are sampled at a rate having a range of 1 Hz-50 KHz.

14. The method of claim 8, wherein said means for applying a weld carries out a gas-metal-arc welding process.

15. The method of claim 8, wherein said means for applying a weld carries out a flux core arc welding process.

16. A method of sensing and controlling a welding process carried out in a system including means for applying a weld to material to be welded using a shielding gas, a power source to energize said means for applying a weld by forming a circuit therewith and generating pulses at selected frequencies, means for sensing in-process weld characteristics, and process means for controlling said weld process in processing means for controlling said weld process in response to sensed in-process weld characteristics indicative of shielding gas quality short circuit occurrence and frequency and pulse frequency and standard deviation thereof, said method comprising the steps of:
   (a) sampling an electrical signal reflecting in-process weld characteristics from said circuit;
   (b) determining local, maximum and minimum values for said sampled electrical signal;
   (c) determining a starting point for each pulse;
   (d) determining an average pulse period based upon said start of each said pulse;
   (e) determining a standard deviation of the average pulse period;
   (f) determining an average pulse voltage for each pulse period;
   (g) determining a mean of the average pulse voltage;
   (h) determining a standard deviation of average pulse voltage based upon the mean of the average pulse voltage;
   (i) calculating shielding gas condition based upon said average pulse voltage and said standard deviation of said average pulse voltage;
   (j) comparing said gas condition to predetermined thresholds to determine if said weld process must be terminated;

(k) determining the occurrence of a short circuit based upon said local minimum value of said sampled electrical signal;

(l) determining an average short circuit frequency by calculating time intervals between short circuit occurrences; and, (m) adjusting said power source in response to said average short circuit frequency.

17. The method of claim 16, wherein said electrical signals are sampled at a rate of 20-30 times per pulse.

18. The method of claim 16, wherein said power source is adjusted when said short circuit frequency is outside of predetermined parameters.

19. The method of claim 18, wherein said selected frequency of said power source is adjusted in response to said short circuit frequency, and current of said power source is adjusted if said power source is a constant current type, and voltage of said power source is adjusted if said power source is a constant voltage type.

20. The method of claim 16, wherein said means for applying a weld employs a gas metal arc welding process.

21. The method of claim 16, wherein said minimum signal point is found using the following process:
   (i) sweeping a window through an entire signal interval;
   (ii) determining a parabola based upon signal data in said window and finding parabola coefficients;
   (iii) determining if the parabola is upwardly concave;
   (iv) determining a minimum parabola point;
   (v) determining if an ordinate of the minimum point of said parabola lies within said window;
   (vi) determining if an absicca of said minimum point of said parabola is a predetermined percentage less than end points of said parabola within said window; and
   (vii) storing said minimum point in a local minimum array.

22. The method of claim 16, wherein said maximum signal value is determined using the following process:
   (i) sweeping a window through an entire signal interval;
   (ii) determining a parabola based upon signal data in said window and finding parabola coefficients;
   (iii) determining if the parabola is downwardly concave;
   (iv) determining a maximum parabola point;
   (v) determining if an ordinate of the maximum point of said parabola lies within said window;
   (vi) determining if an absicca of said maximum point of said parabola is a predetermined percentage greater than end points of said parabola within said window; and
   (vii) storing said maximum point in a local minimum array.

23. The method of claim 16, wherein the start of each pulse period is determined by the following process:
   (i) reading a logic signal from said power source;
   (ii) selecting a data array index having a length less than that of a sample interval array; determining the presence of negative and positive crossings of a threshold;
   (iii) determining if a negative crossing of said threshold occurs in less than a pulse interval;
   (iv) incrementing said data array index where appropriate; and
   (v) placing said data array index into an array of pulse period beginnings.

24. The method of claim 16 wherein the start of each pulse period is determined using the following method:
   (i) calculating an average of sampled electrical signals;
   (ii) determining a threshold based upon a maximum signal value and said average signal;
   (iii) selecting a data array index having a length less than that of a sample interval array; determining the presence of negative and positive crossings of said threshold;
   (iv) determining if a negative crossing of said threshold occurs in less than a pulse interval;
   (v) incrementing said data array index where appropriate; and
   (vi) placing said data array index into an array of pulse period beginnings.

25. The method of claim 16, wherein said means for applying a weld employs a flux core arc welding process.

* * * * *